United States Patent
Kihara et al.

(10) Patent No.: US 8,764,104 B2
(45) Date of Patent: Jul. 1, 2014

(54) STRUCTURE OF FRONT SECTION OF VEHICLE BODY

(75) Inventors: Makoto Kihara, Saitama (JP); Shuji Ichikawa, Saitama (JP); Tomoya Takeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/822,786

(22) PCT Filed: Aug. 25, 2011

(86) PCT No.: PCT/JP2011/069154
§ 371 (c)(1),
(2), (4) Date: Mar. 26, 2013

(87) PCT Pub. No.: WO2012/035946
PCT Pub. Date: Mar. 22, 2012

(65) Prior Publication Data
US 2013/0207417 A1 Aug. 15, 2013

(30) Foreign Application Priority Data

Sep. 14, 2010 (JP) ................................ P2010-206076

(51) Int. Cl.
*B62D 25/08* (2006.01)
*B60R 19/34* (2006.01)
*B62D 21/15* (2006.01)

(52) U.S. Cl.
CPC ................ *B62D 25/08* (2013.01); *B60R 19/34* (2013.01); *B62D 25/085* (2013.01); *B62D 21/152* (2013.01)
USPC ............ 296/193.09; 296/187.09; 296/203.02; 293/155

(58) Field of Classification Search
CPC .... B62D 21/15; B62D 21/152; B62D 21/155; B62D 25/082; B62D 25/084; B62D 25/085; B60R 19/24; B60R 19/26; B60R 19/34
USPC ............ 296/187.03, 187.09, 193.01, 193.09, 296/203.02; 293/132, 133, 154, 155
See application file for complete search history.

(56) References Cited

U.S. PATENT DOCUMENTS

| 5,326,133 | A | * | 7/1994 | Breed et al. | .................. 280/735 |
| 2007/0252412 | A1 | * | 11/2007 | Yatsuda | .................. 296/193.09 |

(Continued)

FOREIGN PATENT DOCUMENTS

| JP | S54-96919 U | 7/1979 |
| JP | 2000-108936 A | 4/2000 |

(Continued)

*Primary Examiner* — Glenn Dayoan
*Assistant Examiner* — Jason S Daniels
(74) *Attorney, Agent, or Firm* — Carrier Blackman & Associates, P.C.; William D. Blackman; Joseph P. Carrier

(57) ABSTRACT

A structure of the front section of a vehicle body is disposed on the front end portion of a front side frame on the same position as the rear surface of a side stay in the front-rear direction of the vehicle body, and includes a first extending portion extending downward along the rear surface of the side stay. A lower stay is provided with a second extending portion extending outward in the vehicle width direction beyond the side stay to a position below the first extending portion. A joining section is formed so as to join the front surface of the first extending portion, the upper surface of the second extending portion, and outside surface of the side stay. The joining section defines an arrangement region for inner and outer shock absorbing members having a lower rigidity than the front side frame.

8 Claims, 5 Drawing Sheets

(56) References Cited

U.S. PATENT DOCUMENTS

| | | | |
|---|---|---|---|
| 2009/0146455 A1* | 6/2009 | Honji et al. | 296/187.09 |
| 2009/0146456 A1* | 6/2009 | Saitou et al. | 296/187.09 |
| 2010/0231006 A1* | 9/2010 | Okabe et al. | 296/203.02 |

FOREIGN PATENT DOCUMENTS

| | | |
|---|---|---|
| JP | 2001-219869 A | 8/2001 |
| JP | 2004-237787 A | 8/2004 |
| JP | 2005-001429 A | 1/2005 |
| JP | 2005-001430 A | 1/2005 |
| JP | 2005-178682 A | 7/2005 |
| WO | WO 2009072673 A1 * | 6/2009 |

* cited by examiner

STRUCTURE OF FRONT SECTION OF VEHICLE BODY

TECHNICAL FIELD

The present invention relates to a vehicle front body structure which includes: left and right front side frames extending longitudinally of a vehicle body in laterally outer areas of a front bulk head of rectangular shape as viewed from a front side; and an impact-absorbing member provided to the front end of the front side frames.

BACKGROUND ART

The thus-arranged vehicle front body structure is known as is disclosed in Patent Document 1, for example.

The vehicle front body structure disclosed in Patent Document 1 comprises left and right front side frames extending longitudinally in the vehicle body at the left and right sides of the vehicle body, a bumper beam extending laterally in front of the front side frames, an impact-absorbing member (a crash pipe) connected to the left and right ends of the bumper beam and extending rearward in the vehicle body, the rear end being fastened to the front ends of the front side frames, and a front bulk head (a shroud panel) disposed between the left and right front side frames and supporting a cooling device. The front bulk head is fastened to a portion medially along the longitudinal direction of the impact-absorbing member (the crash pipe).

With the vehicle front body structure described above, damage to the cooling device supported by the shroud panel can be prevented during light collisions, and the impact absorption performance of the crash pipe can be maintained during heavy collisions.

Normally, to increase the cabin area in a vehicle, the longitudinal length of an engine compartment must be reduced to create a short overhang. To uphold light collision performance, the longitudinal length of the impact-absorbing member (the crash pipe) of the front part of the front side frames must be increased.

However, in the vehicle front body structure disclosed in Patent Document 1, the front bulk head (the shroud panel) is fastened to a portion longitudinally medially along the impact-absorbing member (the crash pipe). Specifically, the impact-absorbing member is made less rigid than the front side frames as a light collision countermeasure, and the connected section is less rigid than when the front bulk head and the front side frames are directly connected together. This connected section is a connected section between front and rear members (front side frames) and left and right members (the front bulk head) forming the engine compartment, and the vehicle body may lose handling stability and torsional rigidity due to a decrease in the connecting rigidity. Handling stability includes two aspects: the maneuverability of the automobile as expected by the driver, and stable traveling during disturbances.

PRIOR ART DOCUMENTS

Patent Documents

Patent Document 1: Japanese Patent Application Laid-Open Publication No. 2004-237787

SUMMARY OF THE INVENTION

Technical Problem

It is an object of the present invention to provide a vehicle front body structure in which the longitudinal length of an engine compartment can be reduced to create a short overhang while an impact-absorbing member can be made sufficiently long in a longitudinal direction. Another object of the present invention is to provide a vehicle front body structure in which the connection strength of the connected section between the front side frames and the front bulk head can be sufficiently ensured.

Solution to Problem

The present invention, as defined in claim 1, provides a vehicle front body structure comprising a front bulk head formed into a rectangular shape as viewed from the front; a pair of left and right front side frames extending longitudinally in the vehicle body at laterally outer sides of the front bulk head; and impact-absorbing members for absorbing impact of a forward collision load, the impact-absorbing members having less rigidity than the front side frames; the front bulk head comprising an upper stay and lower stay extending laterally and a pair of left and right side stays extending vertically in the vehicle body; front ends of the front side frames being disposed in the same positions longitudinally in the vehicle body as rear surfaces of the side stays and having first extending parts extending downward along the rear surfaces of the side stays; the lower stay having second extending parts extending laterally outward past the side stays to positions below the first extending parts; and front surfaces of the first extending parts, top surfaces of the second extending parts, and outside surfaces of the side stays being connected together to form connected sections, the connected sections constituting areas for disposing the impact-absorbing members.

In the invention, as defined in claim 2, preferably, the impact-absorbing members are provided to the front end parts of the front side frames so as to extend farther forward than the front bulk head.

In the invention, as defined in claim 3, preferably, the side stays have a closed cross section shape, and the front end parts of the front side frames comprise flanges extending laterally inward and overlapping the closed cross sections of the side stays in the longitudinal and lateral directions of the vehicle body.

In the invention, as defined in claim 4, preferably, the vehicle front body structure comprises front pillars provided rearward of the front side frames, and upper frames extending forward from a medial section of the front pillars and disposed on the outer sides of the front side frames; the front end parts of the front side frames and the front end parts of the upper frames are connected together so that the front end surfaces thereof are coplanar; and attachment sections horizontally long are formed on the front end surfaces.

In the invention, as defined in claim 5, preferably, the impact-absorbing members are disposed on the horizontally long connected sections so as to laterally overlap the front end parts of the upper frames.

In the invention, as defined in claim 6, preferably, the front side frames are formed into closed cross section shapes having top surfaces, bottom surfaces, outside surfaces, and inside surfaces; and the first extending parts have a front surface, a rear surface, an outside surface, an inside surface, and a bottom surface, and are connected to the bottom surfaces of the front side frames, whereby a box-shaped section is formed.

In the invention, as defined in claim 7, preferably, a support member for supporting a sub frame is provided in the interior of the box-shaped section.

In the invention, as defined in claim 8, preferably, the lower stay is formed into a closed cross section shape; and the top surface of the second extending part is coplanar with the bottom surface of the first extending part.

Advantageous Effects of Invention

In the invention, as defined in claim 1, the longitudinal length of the engine compartment is shortened to create a short overhang, and the impact-absorbing members can be of sufficient longitudinal length. In other words, the areas (longitudinal lengths) where light collisions are counteracted by the impact-absorbing members can be enlarged to the maximum limit. Furthermore, the connection strength of the connected section between the front side frames and the front bulk head can be sufficiently ensured.

In the invention, as defined in claim 2, because the front end parts of the front side frames are provided with the impact-absorbing members extending farther forward than the front bulk head, the impact-absorbing members can be extended forward past the front bulk head. As a result, the input of light collision loads to the front bulk head can be slowed.

In the invention, as defined in claim 3, because the side stays have closed cross section shapes and the front end parts of the front side frames comprise flanges extending laterally inward and overlapping the closed cross sections of the side stays in the longitudinal and lateral directions of the vehicle body, the connecting rigidity between the side stays and the front side frames can be further increased, and the efficiency of load transference from the front bulk head to the front side frames during front collisions can be improved.

Furthermore, spot welds for connecting the front side frames and the front bulk head can be ensured by flanges. It is thereby possible to avoid narrowing the cross sections of the front side frames in order to ensure spot welds. As a result, the cross sections of the front side frames can be enlarged.

In the invention, as defined in claim 4, because the front end parts of the front side frames and the front end parts of the upper frames are connected together so that the front end surfaces thereof are coplanar and the horizontally long attachment sections extending laterally are formed on the front end surfaces, the connected sections and the front end parts of the upper frames can cooperate to further increase the connecting rigidity of the connected sections.

In the invention, as defined in claim 5, because the impact-absorbing members are disposed on the horizontally long attachment sections so as to laterally overlap the front end parts of the upper frames, the lateral areas of the impact-absorbing members can be enlarged, and light collision performance can be improved. Furthermore, because front collision loads are inputted more rapidly to the upper frames, the efficiency of load transference can be improved and loads inputted to the connected sections can be reduced.

In the invention, as defined in claim 6, because the front side frames are formed into closed cross section shapes having top surfaces, bottom surfaces, outside surfaces, and inside surfaces, and the first extending parts have front surfaces, rear surfaces, outside surfaces, inside surfaces, and bottom surfaces, wherein box-shaped sections are formed by connecting the first extending parts to the bottom surfaces of the front side frames; the rigidity of the peripheries of the connected sections between the front side frames and the front bulk head can be further increased.

In the invention, as defined in claim 7, because support members for supporting sub frames are provided in the interiors of the box-shaped sections, the rigidity of the box-shaped sections of the first extending parts can be improved. Thereby, the rigidity of the peripheries of the connected sections between the front side frames and the front bulk head can be further increased.

In the invention, as defined in claim 8, because the lower stay is formed into a closed cross section shape and the top surfaces of the second extending parts are coplanar with the bottom surfaces of the first extending parts, the box-shaped sections of the first extending parts and the closed cross section of the lower stay are firmly connected together. Thereby, the rigidity of the peripheries of the connected sections between the front side frames and the front bulk head can be further increased.

DESCRIPTION OF EMBODIMENTS

Figure 1:
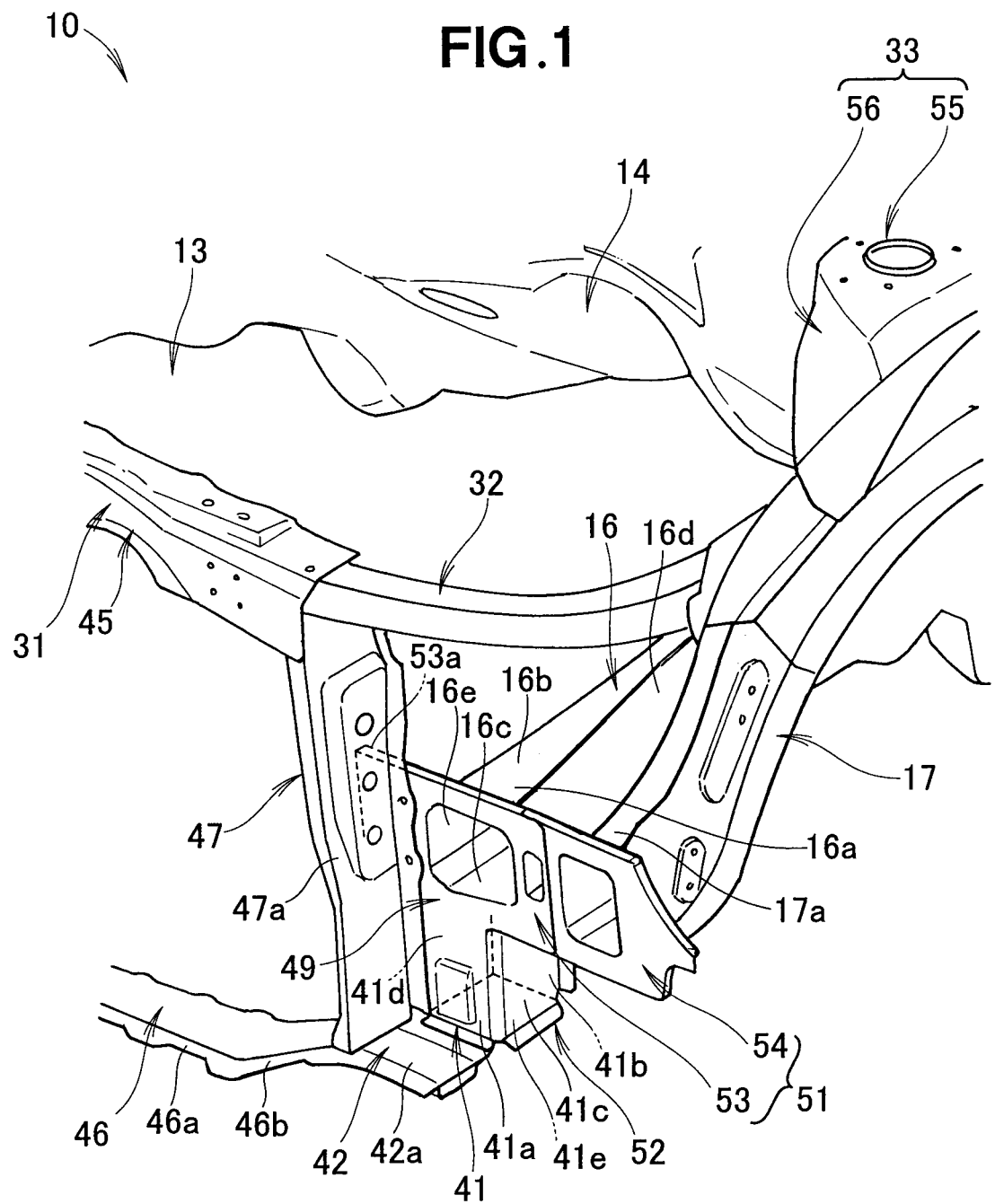
FIG. 1 is a perspective view showing a vehicle front body structure according to a first embodiment of the present invention.

Several preferred embodiments of the present invention will now be described with reference to the accompanying drawings.

[Embodiment 1]

A vehicle front body structure 10 includes a front bulk head 31 formed into a rectangular shape as viewed from the front, as shown in FIGS. 1 through 5. A front side frame 16 extends longitudinally in the vehicle body at the laterally outer side of the front bulk head 31. A front sub frame 18 is supported on the bottom part of the front side frame 16, and an engine (not shown) and a gear box (not shown) are installed thereon.

An upper frame (upper member) 17 is aligned with the front side frame 16 on the outer side, and is curved upward toward the rear of the vehicle body. A rear end section 17b of the upper frame 17 is connected to a front pillar 19 forming the framework of the side front section of a passenger compartment (cabin) 12. A dashboard 14 partitions an engine compartment 13 and the cabin 12. A damper section 33 supports a damper unit (not shown). The bottom part of the damper section 33 is connected to the front side frame 16.

An impact-absorbing member (inner bumper beam extension) 21 on the laterally inner side is provided to the front end of the front side frame 16. An impact-absorbing member (outer bumper beam extension) 22 on the laterally outer side is disposed on the outer side of the bumper beam extension 21 and is provided to the front end of the upper frame 17. A connecting plate 23 is connected so that the inner-side impact-absorbing member 21 and the outer-side impact-absorbing member 22 are laterally aligned. A bumper beam 24 (FIG. 3) is attached to the front ends of the inner-side impact-absorbing member 21 and the outer-side impact-absorbing member 22. A front bulk head upper support 32 is provided so as to extend between the front bulk head 31 and the upper frame 17.

The vehicle front body structure 10 has a connecting structure surrounding the front side frame 16, the upper frame 17, the inner-side impact-absorbing member 21, the outer-side impact-absorbing member 22, and the front bulk head 31.

The front side frame 16, the upper frame 17, the front pillar 19, the inner-side impact-absorbing member 21, the outer-side impact-absorbing member 22, the connecting plate 23, the front bulk head upper support 32, and the damper section 33 are all provided as pairs in left-right symmetry with respect to the lateral direction. The damper section 33 is composed of a damper base 55 to which a damper (damper unit) (not shown) is attached, and a damper housing 56 formed around the damper base 55.

A front end part 16a of the front side frame 16 is disposed in the same position the longitudinally in the vehicle body as a rear surface 47b of a side stay 47 of the front bulk head 31. A first extending part 41, extending downward along the rear surface 47b of the side stay 47, is provided to the front end part 16a of the front side frame 16. The first extending part 41 has a front surface 41a, a rear surface 41b, an outer surface 41c, an inner surface 41d, and a bottom surface 41e, and the first extending part 41 is connected to a bottom surface 16c of the front side frame 16, thereby forming a box-shaped section 52.

The front end part 16a of the front side frame 16 and a front end part 17a of the upper frame 17 are connected so that their respective front end surfaces are coplanar. Specifically, the front side frame 16 has a flange 53 in the front end part 16a, and the upper frame 17 has a flange 54 in the front end part 17a. The flanges 53, 54 are formed so as to be consecutively coplanar.

The flange 53 of the front side frame 16 extends laterally inward, and overlaps longitudinally in the vehicle body and laterally with a closed cross section of the side stay 47 constituting the left and right sides of the front bulk head 31. In other words, an overlapping section 53a of the flange 53 overlaps the side stay 47. The front side frame 16 is formed into a closed cross-sectional shape by a top surface 16b, a bottom surface 16c, an outer surface 16d, and an inner surface 16e.

The first extending part 41 has a support member 44 (see FIG. 5) for supporting the front sub frame 18 in the box-shaped section 52. The support member 44 functions as a rigid body for reinforcing the inside of the box-shaped section 52.

The front pillar 19 is provided rearward of the front side frame 16. The upper frame 17 extends toward the front of the vehicle body from a medial section 19a of the front pillar 19. The front end part 16a of the front side frame 16 and the front end part 17a of the upper frame 17 are connected so as to be coplanar, and an attachment section 51, horizontally long in shape and extending laterally, is formed on the front end part 16a of the front side frame 16 and the front end part 17a of the upper frame 17. The attachment section 51 is configured from the flange 53 of the front side frame 16 and the flange 54 of the upper frame 17.

The inner-side impact-absorbing member 21, which is provided to the front end part 16a of the front side frame 16, extends farther forward than the front bulk head 31. Furthermore, the front end of the inner-side impact-absorbing member 21 is slightly curved laterally outward. Thereby, when a front collision load acts on the bumper beam 24 at an incline from the outside in the lateral direction, crumpling in the inner inner-side impact-absorbing member 21 can proceed smoothly, and absorption of the impact can be promoted.

The outer outer-side impact-absorbing member 22, which is provided to the front end part 17a of the upper frame 17, extends linearly toward the front of the vehicle body. Thereby, when a front collision load acts on the bumper beam 24, crumpling in the outer outer-side impact-absorbing member 22 can proceed smoothly, and absorption of the impact can be promoted.

Figure 3:
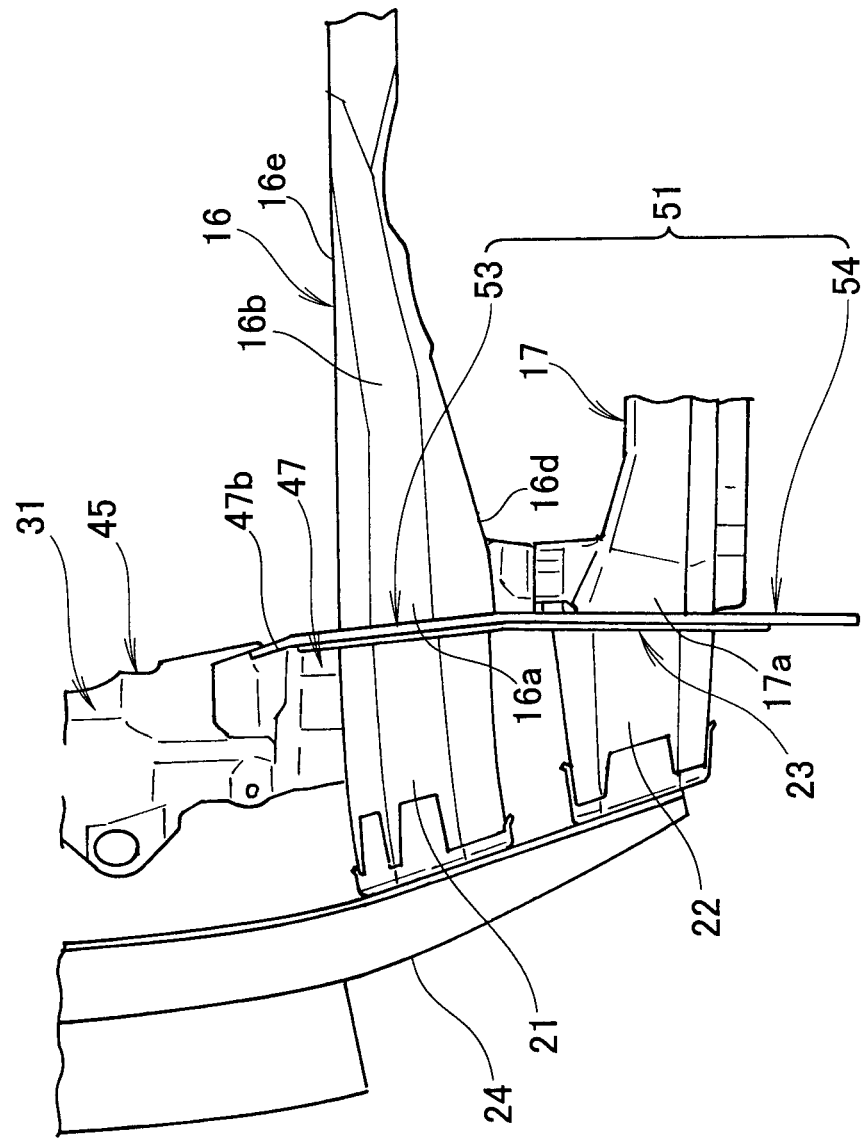
FIG. 3 is a top plan view of the vehicle front body structure of FIG. 2.

The inner inner-side impact-absorbing member 21 and the outer outer-side impact-absorbing member 22 may be formed consecutively in the lateral direction. Specifically, the inner and outer impact-absorbing members 21, 22 are disposed on the horizontally long shaped attachment section 51, and are disposed so as to overlap the front end part 17a of the upper frame 17 with respect to the lateral direction (FIG. 3).

The connecting plate 23 extends laterally, and the inner inner-side impact-absorbing member 21 and the outer outer-side impact-absorbing member 22 are integrally coupled together.

The front bulk head 31 is composed of an upper stay 45 and a lower stay 46 extending laterally, and a pair of left and right side stays 47 extending vertically in the vehicle body. The lower stay 46 is formed into a closed cross-section shape. The lower stay 46 has a second extending part 42 extending laterally outward past the side stay 47 to a position below the first extending part 41 of the front side frame 16. Specifically, the lower stay 46 has a vehicle body part 46a extending substantially horizontally, an inclined part 46b inclined upward and laterally outward in the end section of the vehicle body part 46a, and the second extending part 42 formed on the outside of the inclined part 46b.

Figure 4:
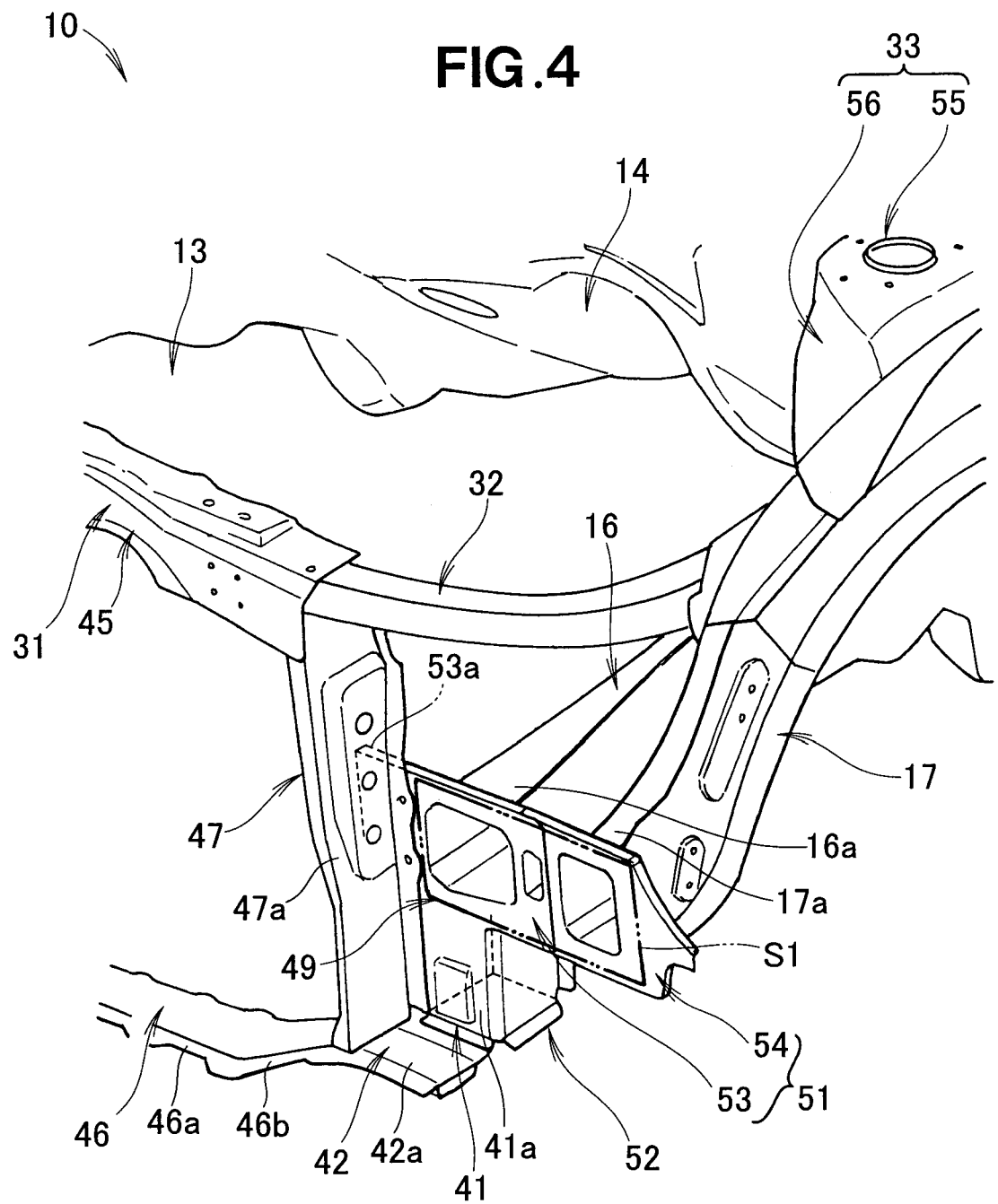
FIG. 4 is a perspective view showing an area where the impact-absorbing member of the vehicle front body structure of FIG. 1 is disposed.

A top surface 42a of the second extending part 42 is formed so as to be substantially coplanar with a bottom surface 41e of the first extending part 41. Three surfaces, namely the front surface 41a of the first extending part 41, the top surface 42a of the second extending part 42, and an outside surface 47a of the side stay 47, are connected together to form a connected section (three-surface connected section) 49, as shown in FIG. 4. A disposed area 51 for the inner and outer impact-absorbing members 21, 22, less rigid than the front side frame 16, is ensured in the connected section 49. Specifically, the connected section 49 is formed into a horizontally long shape extending laterally.

The longitudinal length of the front side frame 16 is shortened so that the front end part 16a of the front side frame 16 is substantially coplanar with the rear surface 47b of the side stay 47 of the front bulk head 31, and the three surfaces are connected together: the front surface 41a of the first extending part 41 extending downward from the front end part 16a of the front side frame 16, the outside surface 47a of the side stay 47, and the top surface 42a of the second extending part 42. The connecting rigidity of the connected section 49 is thereby ensured. Furthermore, the disposed area 51 is provided, in which the necessary longitudinal length of the inner and outer impact-absorbing members 21, 22 is ensured.

The inner and outer impact-absorbing members 21, 22 are provided as extending forward past the front bulk head 31 from the front end part 16a of the front side frame 16. The longitudinal length ensured in the disposed area Si can thereby be an area where light collisions are counteracted by the inner and outer impact-absorbing members 21, 22. Furthermore, because the impact-absorbing members extend forward past the front bulk head 31, front collision loads are borne by the inner and outer impact-absorbing members 21, 22, and the input of light collision loads to the front bulk head 31 is slowed.

The front end part 16a of the front side frame 16 has a flange 53 extending toward the lateral center of the vehicle.

This flange 53 extends to a position where it laps longitudinally with the closed cross section of the side stay 47. The connecting rigidity between the front side frame 16 and the front bulk head 31 is thereby further increased. The efficiency of load transference from the front bulk head 31 to the front side frame 16 during front collisions is thereby improved. Furthermore, a spot weld for connecting the front side frame 16 and the front bulk head 31 together can be ensured by this flange 53. Therefore, there is no need to reduce the size of the cross section of the front side frame 16 in order to ensure a spot weld. Specifically, the cross section of the front side frame 16 can be enlarged.

The front end part 16a of the front side frame 16 and the front end part 17a of the upper frame 17 are connected together so that their respective front end surfaces are coplanar, and the horizontally long attachment section 51 is formed on these front end surfaces. The connected section 49 and the end part of the lower frame can thereby cooperate to further increase the connecting rigidity of the connected section 49. The end part of the lower frame is the coupled portion of the side stay 47.

The inner and outer impact-absorbing members 21, 22 are disposed on the horizontally long attachment section 51 so as to laterally overlap the front end part 17a of the upper frame 17. The lateral area of the inner and outer impact-absorbing members 21, 22 is thereby enlarged, and light collision performance is improved. Front collision loads can be inputted more rapidly to the upper frame 17, the efficiency of load transference is improved, and the values of loads inputted to the connected section 49 are reduced.

The box-shaped section 52 is formed by the front side frame 16 and the first extending part 41. The rigidity of the periphery of the connected section 49 between the front side frame 16 and the front bulk head 31 is thereby further increased.

The interior of the box-shaped section 52 includes the support member 44 composed of a rigid body for supporting the front sub frame 18. The rigidity of the periphery of the connected section 49 between the front side frame 16 and the front bulk head 31 is thereby further increased. The lower stay 46 is formed into a closed cross section shape, and the top surface 42a of the second extending part 42 is formed so as to be substantially coplanar with the bottom surface 41e of the first extending part 41. The rigidity of the periphery of the connected section 49 between the front side frame 16 and the front bulk head 31 is thereby further increased.

Figure 2:
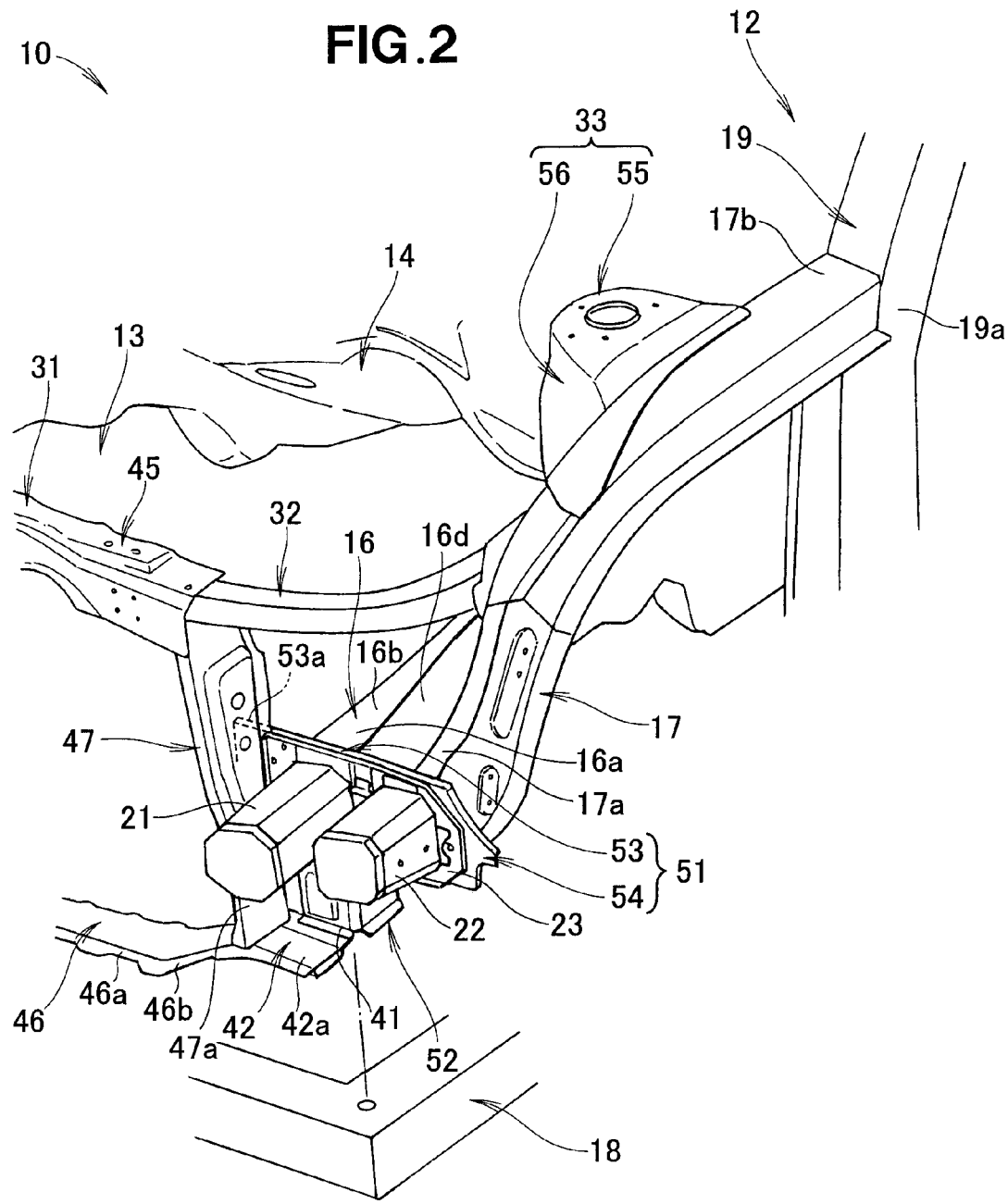
FIG. 2 is a perspective view showing an impact-absorbing member as being attached to a vehicle front body structure of FIG. 1.

The vehicle front body structure 10 comprises the front bulk head 31 formed into a rectangular shape as seen from the front, the pair of left and right front side frames 16 extending longitudinally at the laterally outer sides of the front bulk head 31, and the inner and outer impact-absorbing members 21, 22 for absorbing the impact of front collision loads, as shown in FIGS. 1 through 3.

The front bulk head 31 is composed of the upper stay 45 and the lower stay 46 extending laterally, and the pair of left and right side stays 47 extending vertically in the vehicle body. The front end part 16a of the front side frame 16 is provided with the first extending part 41, which is disposed in the same position longitudinally in the vehicle body as the rear surface 47b of the side stay 47 and which extends downward along the rear surface 47b of the side stay 47, and the lower stay 46 is provided with the second extending part 42, which extends laterally outward past the side stay 47 to a position below the first extending part 41.

Three surfaces: the front surface 41a of the first extending part 41, the top surface 42a of the second extending part 42, and the outside surface 47a of the side stay 47, are connected together to form the connected section 49, and the connected section 49 is configured so as to constitute the disposed area S1 of the inner and outer impact-absorbing members 21, 22 which are less rigid than the front side frame 16; therefore, the longitudinal length of the engine compartment can be shortened to create a short overhang, and the longitudinal length of the impact-absorbing members 21, 22 can be sufficiently ensured. In other words, the area (longitudinal length) where light collisions are counteracted by the inner and outer impact-absorbing members 21, 22 can be enlarged to the maximum limit. Furthermore, the connection strength of the connected section 49 between the front side frame 16 and the front bulk head 31 can be sufficiently ensured.

In the vehicle front body structure 10 as shown in FIG. 2, because the front end part 16a of the front side frame 16 comprises the inner and outer impact-absorbing members 21, 22 extending farther forward than the front bulk head 31, the inner and outer impact-absorbing members 21, 22 can be extended forward past the front bulk head 31. As a result, the input of light collision loads to the front bulk head 31 can be slowed.

In the vehicle front body structure 10 as shown in FIG. 1, because the side stay 47 is member having a closed cross section shape and the front end part 16a of the front side frame 16 comprises the flange 53 extending laterally inward and lapping longitudinally and laterally in the vehicle body with the closed cross section of the side stay 47, the connecting rigidity between the side stay 47 and the front side frame 16 can be further increased, and the efficiency of load transference from the front bulk head 31 to the front side frame 16 during front collisions can be improved.

Furthermore, a spot weld margin for connecting the front side frame 16 and the front bulk head 31 together can be ensured by this flange 53. It is thereby possible to avoid narrowing the cross section of the front side frame 16 in order to ensure a spot weld margin. As a result, the cross section of the front side frame 16 can be enlarged.

As shown in FIGS. 1 and 2, the vehicle front body structure 10 comprises a front pillar 19 provided rearward of the front side frame 16, and an upper frame 17 extending forward from the medial section 19a of the front pillar 19 and disposed on the outer side of the front side frame 16. The front end part 16a of the front side frame 16 and the front end part 17a of the upper frame 17 are connected together so that their front end surfaces are coplanar, and the horizontally long attachment section 51 extending laterally is formed on these front end surfaces; therefore, the connected section (three-surface connected section) 49 and the front end part 17a of the upper frame 17 can cooperate to further increase the connecting rigidity of the connected section 49.

In the vehicle front body structure 10 as shown in FIGS. 2 through 4, the inner and outer impact-absorbing members 21, 22 are disposed on the horizontally long attachment section 51 and are disposed so as to laterally overlap the front end part 17a of the upper frame 17; therefore, the lateral area of the inner and outer impact-absorbing members 21, 22 can be enlarged, and light collision performance can be improved. Furthermore, because front collision loads are inputted to the upper frame 17 more quickly, the efficiency of load transference can be improved, and the loads inputted to the connected section 49 can be reduced.

In the vehicle front body structure as shown in FIG. 1, the front side frame 16 is formed into a closed cross section shape having a top surface 16b, a bottom surface 16c, an outer surface 16d, and an inner surface 16e; the first extending part 41 has a front surface 41a, a rear surface 41b, an outer surface 41c, an inner surface 41d, and a bottom surface 41e; and is connected to the bottom surface 16c of the front side frame 16 whereby the box-shaped section 52 is formed; therefore, the rigidity of the periphery of the connected section 49 between the front side frame 16 and the front bulk head 31 can be further increased.

Figure 5:
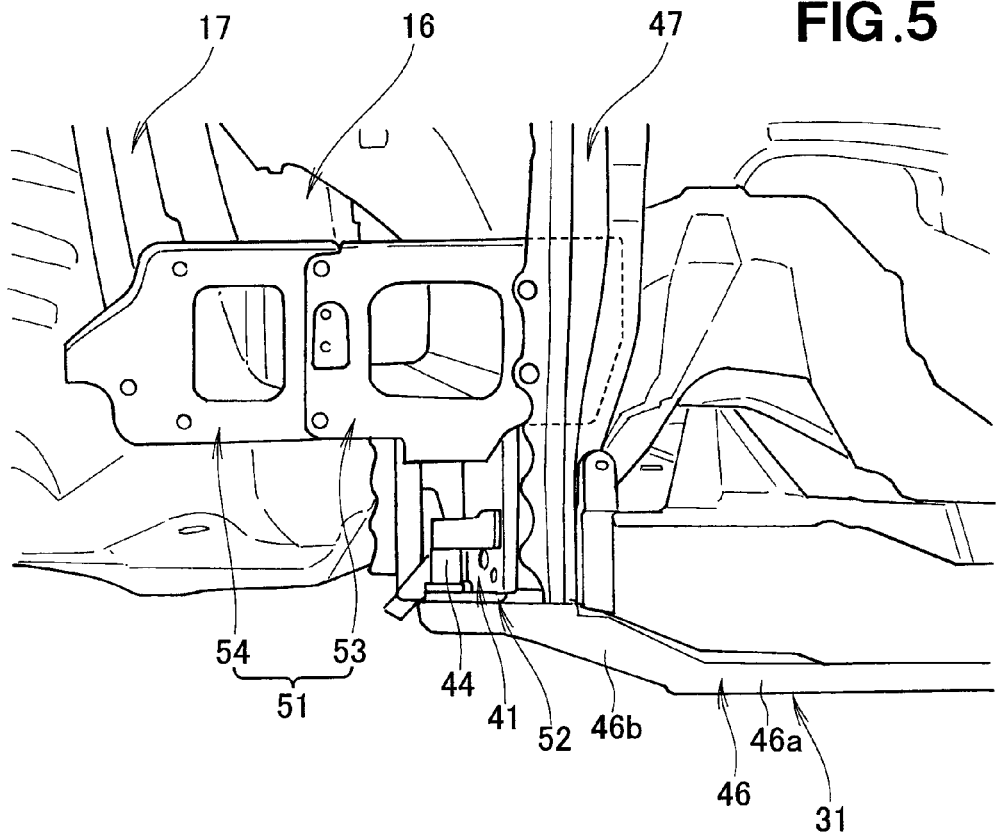
FIG. 5 is a front view showing a right side of the vehicle front body structure of FIG. 1.

In the vehicle front body structure as shown in FIGS. 2 and 5, the support member 44 for supporting the sub frame 18 is provided inside the box-shaped section 52, and the rigidity of the box-shaped section 52 of the first extending part 41 can therefore be improved. The rigidity of the periphery of the connected section 49 between the front side frame 16 and the front bulk head 31 can thereby be further increased.

In the vehicle front body structure as shown in FIG. 1, because the lower stay 46 is formed into a closed cross section shape and the top surface 42a of the second extending part 42 is formed substantially coplanar with the bottom surface 41e of the first extending part 41, the box-shaped section 52 of the first extending part 41 and the closed cross section of the lower stay 46 are firmly connected together. The rigidity of the periphery of the connected section 49 between the front side frame 16 and the front bulk head 31 can thereby be further increased.

[Embodiment 2]

Figure 6:
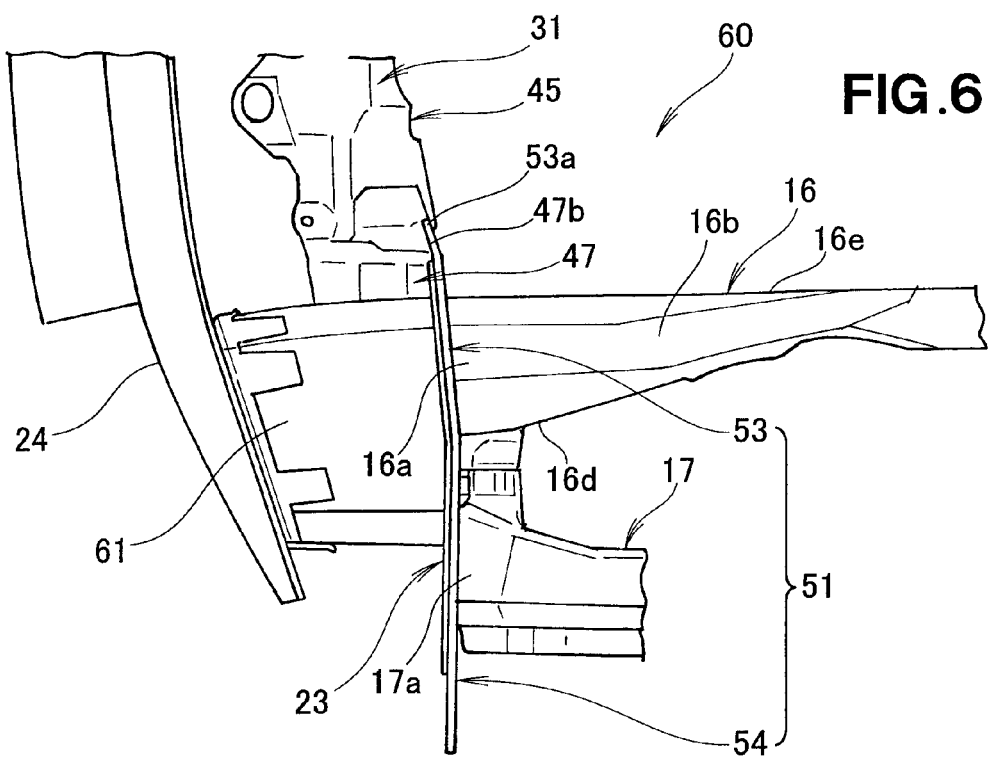
FIG. 6 is a top plan view showing a vehicle front body structure according to a second embodiment of the present invention.

FIG. 6 shows the vehicle front body structure according to Embodiment 2. The same symbols are used to indicate the same components as the vehicle front body structure 10 according to Embodiment 1 shown in FIG. 3, and detailed descriptions of these components are omitted. For the vehicle front body structure according to Embodiment 2, an example is presented in which one impact-absorbing member 61, wide in the lateral direction, is used instead of the two extensions of the inner inner-side impact-absorbing member 21 and the outer outer-side impact-absorbing member 22 of the vehicle front body structure of Embodiment 1.

In the vehicle front body structure 60 according to Embodiment 2, the impact-absorbing member 61 extending farther forward than the front bulk head 31 is provided to the front end part 16a of the front side frame 16, and the impact-absorbing member can therefore be extended forward past the front bulk head 31. As a result, input of light collision loads to the front bulk head 31 can be slowed.

In the vehicle front body structure according to the present invention, the inner and outer impact-absorbing members 21, 22 are disposed on the horizontally long attachment section 51 as shown in FIG. 1, but the structure is not limited to this configuration; alternatively, two extensions of the inner-side impact-absorbing member 21 and the outer outer-side impact-absorbing member 22 can be replaced with one laterally wide impact-absorbing member 61 as shown in FIG. 6.

INDUSTRIAL APPLICABILITY

The present invention is suitable for application in an automobile having a vehicle front body structure comprising a front bulk head formed into a rectangular shape as seen from the front, left and right front side frames extending longitudinally in the vehicle body on the laterally outer sides of the front bulk head, and an impact-absorbing member for absorbing the impact of front collision loads.

Reference Signs List
10 Vehicle body
16 Front side frame
16a Front end part
16b Top surface
16c Bottom surface
16d Outer surface
16e Inner surface
17 Upper frame
17a Front end part
18 Sub frame
19 Front pillar
19a Medial section
21, 22 Impact-absorbing members (inner and outer impact-absorbing members)
23 Connecting plate
31 Front bulk head
41 First extending part
41a Front surface
41b Rear surface
41c Outer surface
41d Inner surface
41e Bottom surface
42 Second extending part
42a Top surface
44 Support member
45 Upper stay
46 Lower stay
47 Side stay
47a Outside surface
47b Rear surface
49 Connected section
52 Box-shaped section
53 Flange

The invention claimed is:

1. A vehicle front body structure comprising:
a front bulk head formed into a rectangular shape as viewed from a front side;
a pair of left and right front side frames extending longitudinally of a vehicle body at laterally outer sides of the front bulk head; and
impact-absorbing members having less rigidity than the front side frames, for absorbing an impact of a forward collision load,
wherein:
the front bulk head comprises upper and lower stays extending laterally in a width direction of the vehicle body, and a pair of left and right side stays extending vertically of the vehicle body,
front ends of the front side frames are disposed at same positions longitudinally of the vehicle body as rear surfaces of the side stays, the front ends of the front side frames including first extending parts comprising substantially vertical panel sections extending downward along the rear surfaces of the side stays, and overlapping parts which respectively extend behind and overlap rear portions of the side stays;
the lower stay having second extending parts comprising substantially horizontal panel sections extending laterally outward past the side stays to positions below the vertical panel sections of the first extending parts, and
front edge surfaces of the first extending parts, top edge surfaces of the second extending parts and outside edge surfaces of the side stays are connected together to form connected sections, the connected sections forming areas for disposing the impact-absorbing members.

2. The vehicle front body structure of claim 1, wherein the impact-absorbing members are provided to the front ends of the front side frames so as to extend farther forward than the front bulk head.

3. The vehicle front body structure of claim 1, wherein the side stays each have a closed cross section, and the front ends of the front side frames comprise flanges extending laterally inward and overlapping the closed cross sections of the side stays in the longitudinal and lateral directions of the vehicle body.

4. The vehicle front body structure of claim 1, further comprising: front pillars provided rearwardly of the front side frames, and upper frames extending forward from a medial section of the front pillars and disposed on the outer sides of the front side frames, wherein the front ends of the front side frames and front ends of the upper frames are connected together so that front end surfaces thereof are coplanar, and attachment sections horizontally long and extending laterally are formed on the front end surfaces.

5. The vehicle front body structure of claim 4, wherein the impact-absorbing members are disposed on the horizontally long attachment sections so as to laterally overlap the front ends of the upper frames.

6. A vehicle front body structure comprising:
a front bulk head formed into a rectangular shape as viewed from a front side;
a pair of left and right front side frames extending longitudinally as component parts of a vehicle body at laterally outer sides of the front bulk head; and
impact-absorbing members disposed on each side of the front bulk head, said impact-absorbing members having less rigidity than the front side frames, for absorbing an impact of a forward collision load,
wherein:
the front bulk head comprises upper and lower stays extending laterally in a width direction of the vehicle body, and a pair of left and right side stays extending vertically of the vehicle body,
front ends of the front side frames are disposed at same positions longitudinally of the vehicle body as rear surfaces of the side stays and include flange portions having first extending parts comprising substantially vertical panel sections extending downward along the rear surfaces of the side stays;
the lower stay comprising second extending parts comprising substantially horizontal panel sections extending laterally outward past the side stays to positions below the vertical panel sections of the first extending parts, and
front edge surfaces of the first extending parts, top edge surfaces of the second extending parts and outside edge surfaces of the side stays are connected together to form connected sections, the connected sections forming areas for disposing the impact-absorbing members;
wherein the front side frames are formed with closed cross sectional shapes each having a top surface, a bottom surface, an outside surface, and an inside surface, and the first extending parts each have a front surface, a rear surface, an outside surface, an inside surface, and a bottom surface disposed below a bottom surface of a corresponding front side frame, and wherein the first extending parts are connected to the bottom surfaces of the front side frames, whereby a box-shaped section is formed on each side of said vehicle front body structure.

7. The vehicle front body structure of claim 6, wherein a support member for supporting a sub frame is provided in an interior of the box-shaped section.

8. The vehicle front body structure of claim 6, wherein the lower stay is formed with a closed cross sectional shape, while the top surface of the second extending part is coplanar with the bottom surface of the first extending part.

* * * * *